United States Patent [19]

Clapper

[11] Patent Number: 4,746,089
[45] Date of Patent: May 24, 1988

[54] MAGNETIC FUEL TANK CAP HOLDING SYSTEM

[76] Inventor: Earl Clapper, 1428 E. 3rd St., Long Beach, Calif. 90802

[21] Appl. No.: 28,868

[22] Filed: Mar. 23, 1987

[51] Int. Cl.⁴ .................................................. A47F 5/00
[52] U.S. Cl. .............................. 248/309.4; 248/205.3; 248/206.5; 296/1 C
[58] Field of Search .................... 248/206.5, 359, 360, 248/205.3, 309.4; D12/197; 220/DIG. 33, 85 CH; 296/1 C; 280/152 A; 211/DIG. 1; 224/273, 42.43

[56] References Cited

U.S. PATENT DOCUMENTS

| | | | |
|---|---|---|---|
| 2,702,683 | 2/1955 | Green et al. | 220/85 CH |
| 2,758,743 | 8/1956 | Smith | 220/DIG. 33 X |
| 3,008,754 | 11/1961 | Fiala | 296/1 C |
| 3,131,897 | 5/1964 | Shelker et al. | 248/206.5 X |
| 3,350,045 | 10/1967 | Mayers | 248/206.5 X |
| 4,390,201 | 6/1983 | Saunders | 296/1 C |
| 4,653,711 | 3/1987 | Marshell | 224/273 X |

Primary Examiner—J. Franklin Foss
Attorney, Agent, or Firm—Charles H. Thomas

[57] ABSTRACT

A flat magnet is secured to the interior surface of the access door for an automotive vehicle fuel tank filling inlet. When the vehicle is to be refueled the fuel tank cap is removed from the filling inlet and placed against the magnet on the interior surface of the access door. The fuel tank cap is thereupon releasably held by the force of magnetism against the inside surface of the access door until it is removed therefrom and replaced on the filling inlet. The fuel tank cap is thereby safeguarded and loss of the cap is prevented.

9 Claims, 1 Drawing Sheet

MAGNETIC FUEL TANK CAP HOLDING SYSTEM

BACKGROUND OF THE INVENTION

1. Field of the Invention

The present invention relates to a new system for safe guarding the fuel tank caps of automotive vehicles during refueling.

2. Description of the Prior Art

Most automobiles which are currently manufactured have fuel tank filling inlets located behind access doors in the sides of the rear portions of the bodies of the vehicles. A filling inlet access door is typically oriented in an upright, generally vertical disposition and is rotatably mounted on the vehicle body by a hinge or a pair of hinges. A latch is usually provided on the door opposite the hinges, and normally requires a key in order for the access door to be opened. The neck of the fuel tank filling inlet is located in a cavity defined behind the access door and is accessible when the access door is opened. A fuel tank cap is used to seal the mouth of the filler neck and is removed only during refueling.

Conventional vehicles include a variety of different fuel tank filling inlet cap configurations, but virtually all fuel tank filling inlet caps include some type of cam or thread mechanism whereby the cap may be releasably secured to close the filling inlet by means of a rotational movement relative thereto. The cap may be disengaged by counter-rotation. Some fuel tank filling inlet caps employ a central hub which is externally threaded to cooperate with internal threads defined in the mouth of the filler inlet. Other types of filling inlet caps include a central hub with a pair of radially extending lugs that pass through radial cut-outs in a radial lip on the mouth of the filling inlet. The lip at the filling inlet mouth includes an interior ledge with a camming surface, so that the cap is pulled longitudinally into sealing engagement with the filling inlet mouth by the force of the lugs against the camming surface as the cap is rotated relative to the mouth. There are many other configurations of fuel tank inlet caps, but nearly all such caps employ a traverse end closure with some releasable fastening mechanism which may be secured to the mouth of the filling inlet by a rotational motion.

During refueling the fuel tank inlet cap must be removed so that the nozzle of a fuel hose may be inserted into the mouth of the filling inlet. Once the inlet cap is removed, the user normally places the cap on the hood or roof of the vehicle, or upon the housing for the fuel station pump. Not infrequently, the user forgets to replace the cap when refueling is completed. The cap then remains on the fuel station pump housing, or falls from the roof or hood of the vehicle as the vehicle is driven away. In either event the fuel cap is lost. This can lead to a dangerous condition with fuel spilling from the uncapped mouth of the tank inlet. At the very least, the owner of the vehicle must face the expense and inconvenience of replacing the filling inlet cap.

Various types of cap hangers have been devised to allow a fuel tank cap to be releasably secured about the filler neck or to the access door so as to prevent the cap from becoming lost if the user forgets to replace it on the filler inlet. However, all conventional systems of this type involve cap hangers or leashes which require excessive manipulation to engage the fuel tank cap therewith, or which are too easily damaged by the manipulation for engagement which is required.

SUMMARY OF THE INVENTION

The present invention is a method of preventing the loss during refueling of a fuel tank cap from an automotive vehicle having a fuel tank filler inlet access door. According to the invention a magnet is mounted on the inside surface of the access door. When the vehicle is to be refueled, the fuel tank cap is placed against the magnet during refueling. In this way the fuel tank cap is held to the access door by the force of magnetism.

Many fuel tank inlet caps are constructed of steel and will be attracted directly by the magnet. In other vehicles the fuel tank cap is constructed of a material, such as plastic which is not attracted by magnetism. In those vehicles in which the fuel tank cap is constructed of non-ferrous materials, a ferrous plate, such as a steel disk, is permanently mounted on the fuel tank cap. Double sided pressure sensitive adhesive tape may be utilized to secure the plate to the fuel tank cap. Thereafter, the fuel tank cap will be held against the magnet on the inside surface of the access door, when placed thereagainst, since the ferrous plate is attracted by the magnet.

The method of the invention provides an extremely simple and economical means of safeguarding fuel tank caps during refueling. Even if a user forgets to replace the fuel tank cap on the filling inlet neck once refueling is completed, and drives the vehicle away without replacing the cap, loss of the cap is prevented, since it will be held against the inside surface of the access door by the force of magnetism. Ultimately, the user will discover the oversight of failing to replace the fuel tank cap. The user then merely overcomes the force of magnetic attraction and pulls the fuel tank cap away from the inside surface of the access door. The user then replaces the fuel tank cap on the filling inlet neck.

The invention may be described with greater clarity and particularity by reference to the accompanying drawings.

DESCRIPTION OF THE IMPLEMENTATION OF THE METHOD

Figure 1:
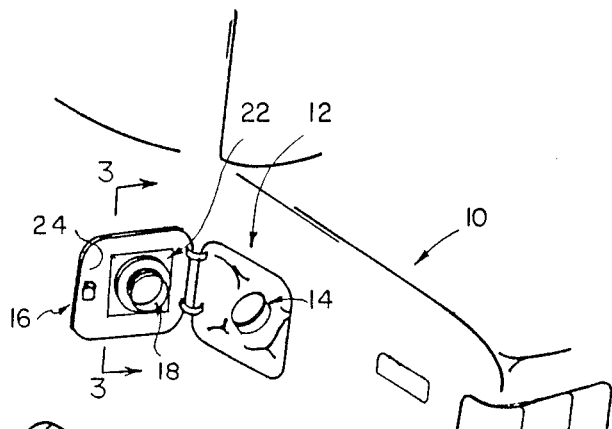
FIG. 1 is a perspective view illustrating the method of the invention as practiced on an automobile.
Figure 3:
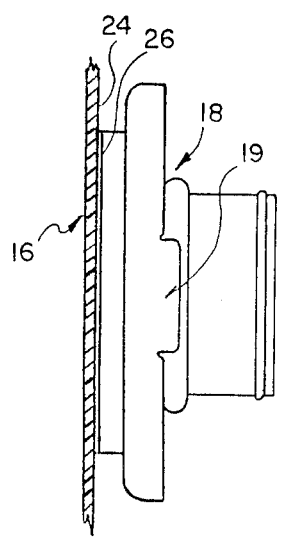
FIG. 3 is a sectional detail taken along the lines 3—3 of FIG. 1.
Figure 4:
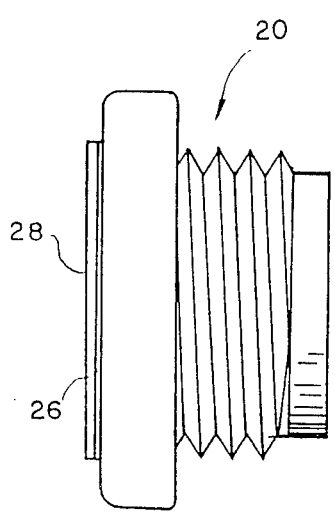
FIG. 4 illustrates the implementation of the invention with a plastic filling inlet cap.

FIG. 1 illustrates a portion of an automotive vehicle 10 including the rear fender area 12 thereof. As is typical among many automobiles, a fuel tank filler inlet 14 is located in a cavity defined in the rear fender region 12 and is accessible by means of a small access door 16. The access door 16 is constructed of steel and is secured by hinges to the steel body of the automobile 10. The filler inlet 14 is formed as a neck leading to the vehicle fuel tank at the underside of the vehicle and has an upper end that terminates in a mouth which is configured to receive a fuel tank cap 18 in a conventional manner. Typically the mouth of the inlet neck 14 may include a radially outwardly directed lip having notches therein adapted to receive a pair of opposing inwardly directed lugs 19 on the fuel tank cap 18. Such a connection is typical of a metal fuel tank inlet cap 18 of the type depicted in FIGS. 1-3. Alternatively, the mouth of the fuel tank filler inlet 14 may be internally threaded with female threads so as to receive external male threads on a fuel tank cap 20 of the type depicted in FIG. 4. The fuel tank cap connecting system depicted in FIG. 4 is typical of a conventional non-ferrous plastic fuel tank cap.

The manner of releasable connection of the fuel tank cap 18 or 20 to the filler neck inlet 14 may be of any type that is commercially available, and the attachment mechanism between the fuel tank cap and the filler neck forms no part of the present invention.

Figure 2:
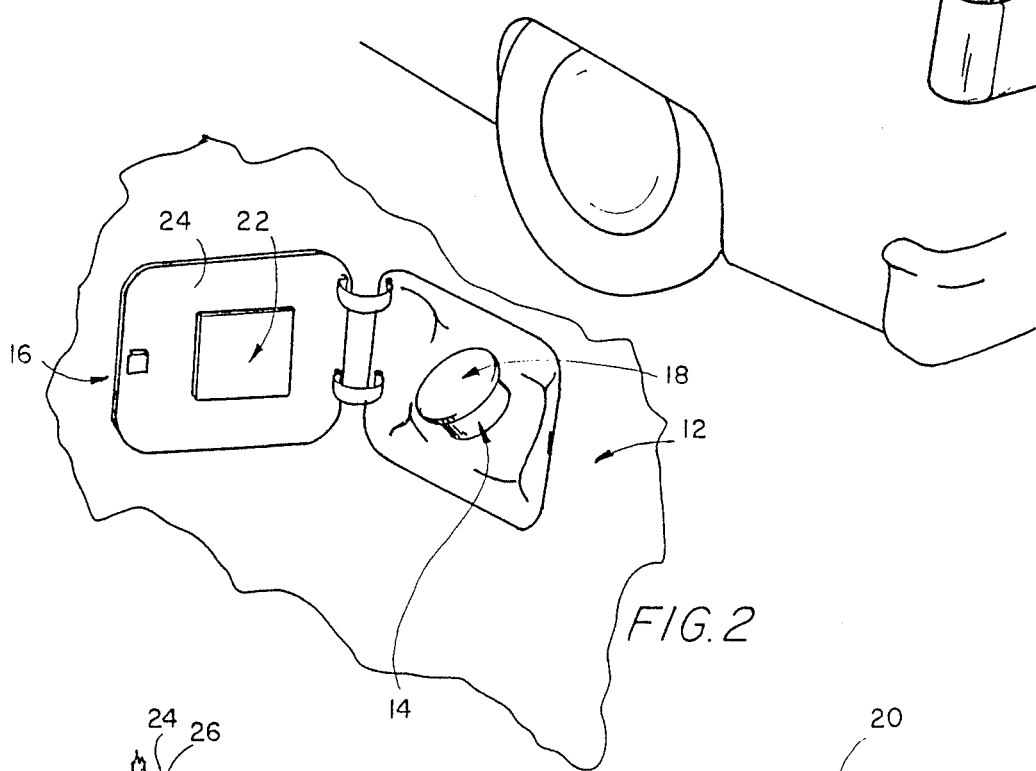
FIG. 2 is an enlarged detail of the automotive vehicle filling inlet access door and filling inlet of FIG. 1 further illustrating the practice of the invention.

According to the invention a magnet 22, which may be a flat magnet of rectangular configuration as depicted in FIG. 2, is mounted on the inside surface 24 of the inlet access door 16. When the automotive vehicle 10 is to be refueled, the fuel tank cap 18 may be removed from the mouth of the filler inlet neck 14 and merely placed against the magnet 22 while refueling in the manner depicted in FIG. 1. As illustrated, the fuel tank cap 18 is held to the access door 16 by the force of magnetism. When refueling is completed the fuel tank cap 18 is pulled free from the magnet 22 and is replaced and releasably reengaged with the filler inlet neck 14, in the manner depicted in FIG. 2.

Since the filler neck inlet access door 16 is typically constructed of cold rolled steel, the magnet 22 could be secured to the interior surface 14 of the access door 16 merely by the force of magnetism. However, since some force is employed to manually remove the fuel tank cap 18 from the magnet 22 when the fuel tank cap 18 is to be replaced on the inlet neck 14, it is more advisable to secure the magnet 22 to the inside surface 24 of the access door 16 with some form of fastening means, so that the magnet 14 remains in place on the interior surface 24 when the fuel tank cap 18 is removed therefrom. One very satisactory method of attaching the magnet 22 to the surface 24 is by using strips of double sided pressure sensitive adhesive tape 26, as illustrated in FIG. 3. The tape 26 has adhesive on both of its opposite sides, although one side is typically covered with paper coated with a release agent prior to use of the tape 26. To install the magnet 22 on the interior surface 24 of the access door 16, the exposed, adhesive coated surfaces of several strips of tape 26 are pressed against the interior surface 24 of the access door 16 at locations which conform to the interior periphery of the magnet 22. The protective paper is then pulled free from the opposite surfaces of the strips of tape 26, thereby exposing the adhesive on those surfaces. The magnet 22 is then pressed against these exposed surfaces, so that it is securely, firmly and permanently attached to the interior surface 24 of the fuel tank filler neck inlet access door 16.

The magnet 22 may be constructed from any type of conventional magnetic material. For example, the magnet 22 may be constructed completely of a slab of magnetized iron or steel. Alternatively, however, the magnet 22 may be constructed of particles of magnetized iron encapsulated in a rubber base. This type of construction has an advantage in that the magnet 22 will be unlikely to scratch or mar the fuel tank cap 18 or 20.

Once the magnet 22 has been installed in the manner illustrated in FIG. 2, it will serve to hold the fuel tank cap 18 and safeguard it from loss during refueling. At all times except during refueling the fuel tank cap 18 remains releasably engaged with the mouth of the filler inlet neck 14, in the manner illustrated in FIG. 2. When the automotive vehicle 10 is to be refueled, however, the fuel tank cap 18 is removed from the mouth of the neck 14, and the broad outer surface of the cap 18 is placed against the magnet 22. The fuel tank cap 18 is thereby releasably held to the fuel tank access door 16 by the force of magnetism, in the manner illustrated in FIGS. 1 and 3.

The invention may also be employed with fuel tank caps constructed of non-ferrous materials. Such as the plastic cap 20 depicted in FIG. 4. When the invention is practiced with a non-ferrous fuel tank cap 20, it is necessary to first permanently mount a ferrous plate 28 on the fuel tank cap 20. The plate 28 is preferably simply a disk of cold rolled steel or iron. Preferably, the ferrous plate 28 is permanently secured to the top of the non-ferrous fuel tank cap 20 by means of strips of tape 26. The tape 26 is the same double sided pressure sensitive adhesive tape as is used to secure the magnet 22 to the interior surface 24 of the access door 16. With the steel plate 28 secured to the cap 20 as illustrated in FIG. 4, the cap 20 will be attracted by the magnet 22 when it is placed against the magnet 22. The fuel tank cap 20 can thereby be held and safeguarded in the same manner as the fuel tank cap 18.

Undoubtedly, numerous variations and modifications of the invention will become readily apparent to those familiar with the construction, design and use of automotive vehicles and their accessories. Accordingly, the scope of the invention should not be construed as limited to the specific implementation depicted and described herein, but rather is defined in the claims appended hereto.

I claim:

1. A method of holding an automotive vehicle fuel tank cap during refueling, which cap has an exteriorly facing top portion and an interiorly directed portion with means for contacting and engaging a filler neck comprising: mounting a magnet upon the inside of an automotive vehicle fuel tank inlet access door, removing said fuel tank cap from the fuel tank inlet, and placing said exteriorly facing portion of said fuel tank cap against said magnet, whereby said fuel tank cap is releasably held to said fuel tank inlet access door by the force of magnetism so that said interiorly directed portion of said cap is held directed away from and out of contact with said fuel tank inlet access door.

2. A method according to claim 1 wherein said fuel tank cap is constructed of non-ferrous materials and further comprising permanently mounting a ferrous plate on said fuel tank cap.

3. A method of preventing the loss during refueling of an automotive vehicle fuel tank cap having an exteriorly facing top portion and an interiorly directed portion with means for contacting and engaging a filler neck of an automotive vehicle having a fuel tank filler inlet access door adjacent to said filler neck comprising: mounting a flat magnet on the isnside surface of said fuel tank inlet access door, and placing said exteriorly facing top portion of said fuel tank cap against said magnet while refueling, whereby said top of said fuel tank cap is held to said access door by the force of magnetism and said interiorly directed portion of said cap is held directed away from and out of contact with said fuel tank inlet access door.

4. A method according to claim 3 wherein said fuel tank cap is not attracted by magnetism and further comprising permanently securing a ferrous metal plate to said fuel tank cap.

5. A method according to claim 4 further comprising using double sided pressure sensitive adhesive tape to secure said plate to said fuel tank cap.

6. A method according to claim 3 further comprising using double sided pressure sensitive adhesive tape to secure said magnet to said access door.

7. In a method of safeguarding an automotive vehicle fuel tank cap of an automotive vehicle having a fuel tank filling inlet and a fuel tank filling inlet access door adjacent to said fuel tank filling inlet, in which said fuel tank cap has an exteriorly facing top portion and an interiorly directed portion with means for contacting and engaging said filler neck, the improvement comprising mounting a magnet upon the inside surface of said access door, removing said fuel tank cap from said filling inlet, and placing said top of said fuel tank cap against said magnet, whereby the top of said fuel tank cap is held against said access door by the force of magnetism and said interiorly directed portion is held directed away from and out of contact with said fuel tank inlet access door.

8. A method according to claim 7 further comprising using tape having pressure sensitive adhesive on both of its opposite sides to secure said magnet to said access door.

9. A method according to claim 7 wherein said fuel tank cap is not attracted by the force of magnetism further comprising securing a ferrous plate to said fuel tank cap, whereby said ferrous plate holds said fuel tank cap to said access door when said fuel tank cap is placed against said magnet.

* * * * *